United States Patent
Inai

(10) Patent No.: US 9,724,987 B2
(45) Date of Patent: Aug. 8, 2017

(54) WEATHER STRIP

(71) Applicant: HONDA MOTOR CO., LTD., Minato-ku, Tokyo (JP)

(72) Inventor: Yohei Inai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/913,451

(22) PCT Filed: Aug. 21, 2014

(86) PCT No.: PCT/JP2014/071849
§ 371 (c)(1),
(2) Date: Feb. 22, 2016

(87) PCT Pub. No.: WO2015/029863
PCT Pub. Date: Mar. 5, 2015

(65) Prior Publication Data
US 2016/0200184 A1 Jul. 14, 2016

(30) Foreign Application Priority Data
Sep. 2, 2013 (JP) ................... 2013-181172

(51) Int. Cl.
*E06B 7/16* (2006.01)
*B60J 10/84* (2016.01)
(Continued)

(52) U.S. Cl.
CPC ............... *B60J 10/84* (2016.02); *B60J 10/25* (2016.02); *B60J 10/27* (2016.02)

(58) Field of Classification Search
CPC ............. B60J 10/84; B60J 10/27; B60J 10/25
(Continued)

(56) References Cited

U.S. PATENT DOCUMENTS 2,647,792 A * 8/1953 Flemming ................ B60J 10/80
296/76
4,653,801 A * 3/1987 Shirasu .................. B60R 13/06
296/202

(Continued)

FOREIGN PATENT DOCUMENTS

JP         S57-30640 A     2/1982
JP         59073342 A  *  4/1984
(Continued)

OTHER PUBLICATIONS

Office Action dated Jan. 16, 2017 issued in the corresponding Chinese Patent Application 201480048235.6 with the English translation thereof.

*Primary Examiner* — Jerry Redman
(74) *Attorney, Agent, or Firm* — Carrier Blackman & Associates, P.C.; William D. Blackman; Joseph P. Carrier

(57) ABSTRACT

Seal sections of a weather strip comprise: an upper edge section seal which is in contact with the upper edge section of a door; a side edge section seal which is in contact with a side edge section of the door; and a connecting section seal which connects the upper edge section seal to the side edge section seal. The seal sections comprise first drip channels which are capable of connecting water from the exterior of a vehicle. Second drip channels, which are capable of collecting water that flows along the vehicle exterior sides of the seal sections, are formed between the seal sections and the drip lips. A communication section, which communicates between one first drip channel and one second drip channel, is formed in the connection section seal.

10 Claims, 7 Drawing Sheets

(51) Int. Cl.
*B60J 10/27* (2016.01)
*B60J 10/25* (2016.01)

(58) Field of Classification Search
USPC .................................. 296/93, 213; 49/495.1
See application file for complete search history.

(56) References Cited

U.S. PATENT DOCUMENTS

| | | | | |
|---|---|---|---|---|
| 5,054,242 | A * | 10/1991 | Keys | B60J 10/24 49/374 |
| 5,106,149 | A * | 4/1992 | Glossop, Jr. | B60J 10/248 296/146.9 |
| 5,127,193 | A * | 7/1992 | Okada | B60J 10/21 264/146 |
| 5,279,782 | A * | 1/1994 | Yamamoto | B29C 47/046 156/244.19 |
| 5,367,830 | A * | 11/1994 | Omura | B60J 10/80 49/475.1 |
| 5,376,319 | A * | 12/1994 | Arima | B29C 47/0028 156/244.13 |
| 5,456,049 | A * | 10/1995 | Goto | B60J 10/18 296/146.15 |
| 5,775,768 | A * | 7/1998 | Yamane | B60J 10/24 296/146.9 |
| 5,797,644 | A * | 8/1998 | Hamabata | B60J 10/22 296/146.9 |
| 6,446,392 | B1 * | 9/2002 | Maki | B60J 10/265 49/377 |
| 6,487,820 | B1 * | 12/2002 | Nakajima | B29C 47/0019 428/122 |
| 6,536,833 | B2 * | 3/2003 | Nozaki | B60J 10/24 296/146.9 |
| 6,539,671 | B2 * | 4/2003 | Yamaguchi | B60J 10/35 49/475.1 |
| 7,363,749 | B2 * | 4/2008 | Sultan | B60J 10/248 49/490.1 |
| 2016/0144698 | A1 * | 5/2016 | Inai | B60J 10/84 49/495.1 |

FOREIGN PATENT DOCUMENTS

| | | | |
|---|---|---|---|
| JP | 02286445 A | * | 11/1990 |
| JP | H09-175182 A | | 7/1997 |
| JP | 2003025931 A | | 1/2003 |
| JP | 2004322984 A | * | 11/2004 |
| JP | 2012-228968 A | | 11/2012 |

* cited by examiner

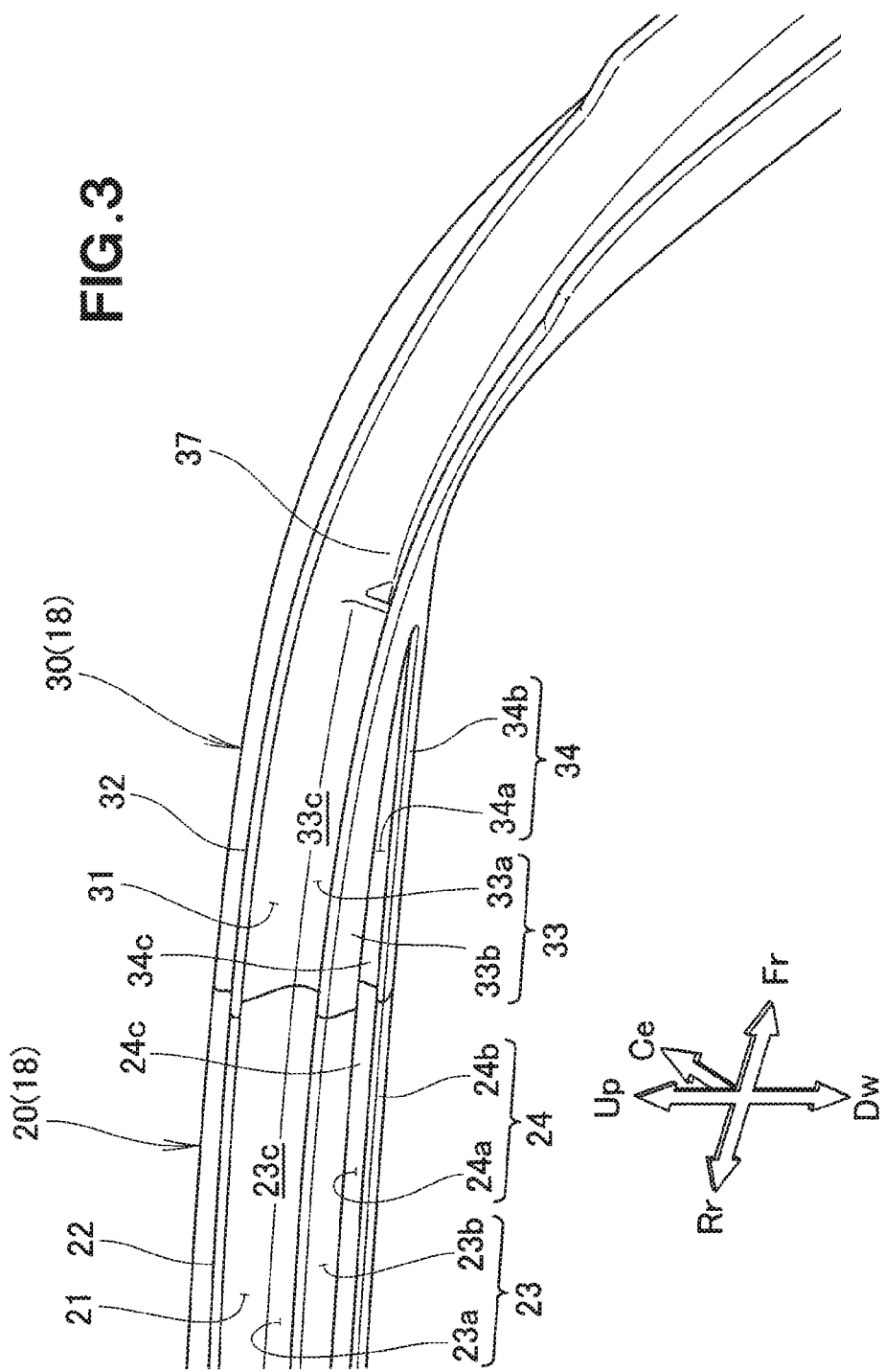

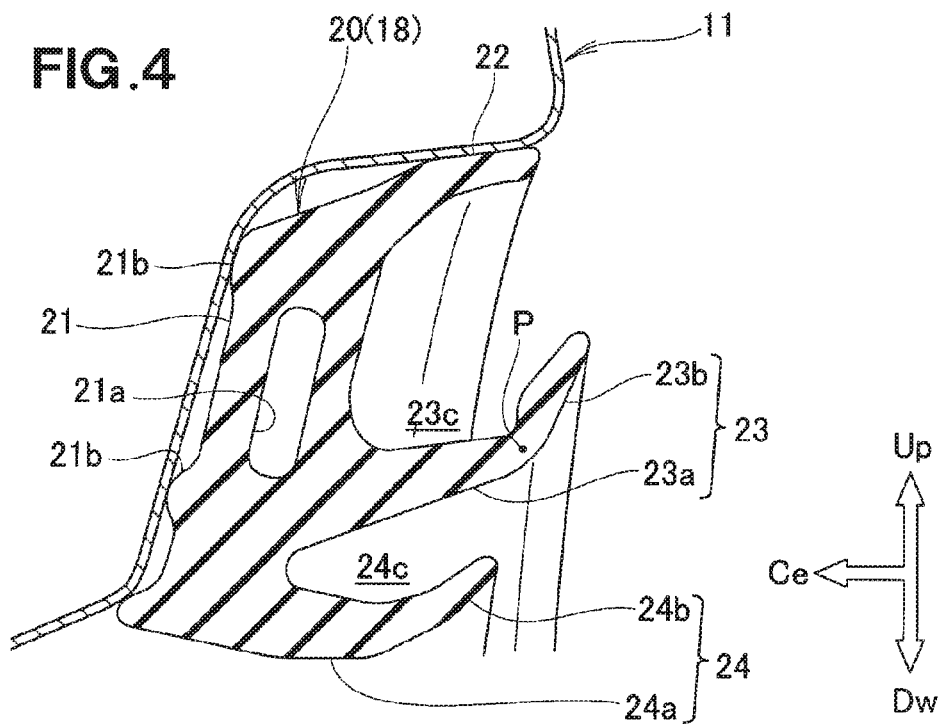
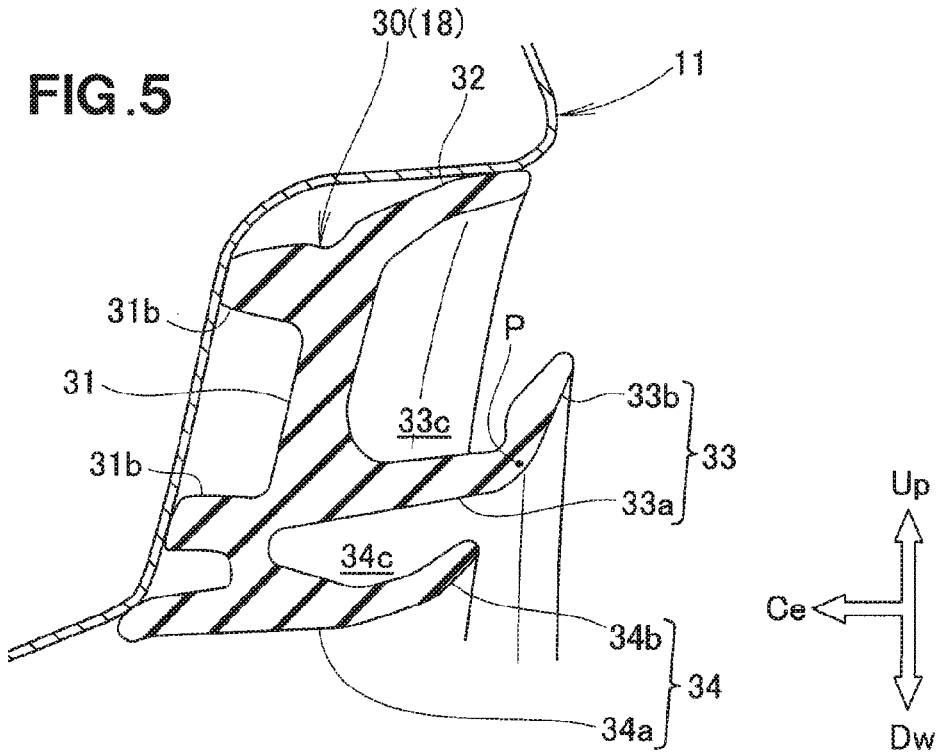

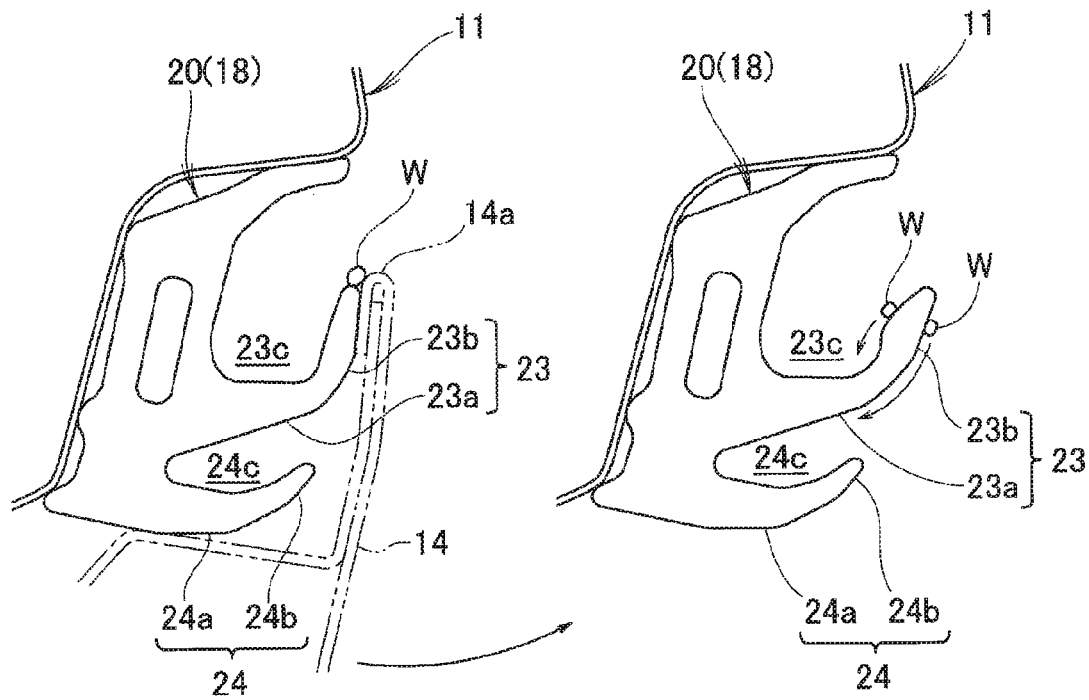
FIG. 10(a)  FIG. 10(b)
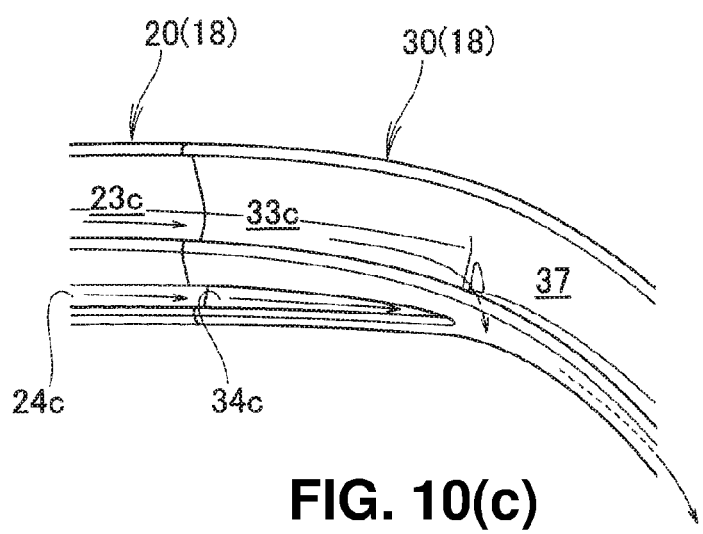
FIG. 10(c)

WEATHER STRIP

TECHNICAL FIELD

The present invention relates to a weather strip which is provided to an edge section of a door opening of a vehicle such that it comes into contact with a closed door.

BACKGROUND ART

A slight gap is present between the vehicle body and the door. A weather strip is attached to an edge section of a door opening of a vehicle body in order to prevent water from penetrating into the passenger compartment through the gap. The weather strip is in contact when the door is closed, and blocks the gap between the vehicle body and the door. The technique disclosed in Patent Document 1 is an example of prior art related to such a weather strip.

A weather strip such as that described in Patent Document 1 has an attachment base section attached to the vehicle body and a seal section that extends from the attachment base section toward the door. A drip lip, which is capable of collecting water that travels along a vehicle exterior side of the seal section, is formed below the seal section. The water that travels along the vehicle exterior side of the seal section is collected by the drip lip. It is therefore possible to prevent drops of water from falling on the head of a vehicle occupant when they exit or enter the vehicle.

In order to prevent drops of water falling onto the head, presumably the drip lip should be formed only in a location that corresponds to the upper edge of the door. However, when the drip lip is omitted from the end section of the upper edge of the door, water that has flowed along the drip lip falls from the omitted location. Such drops of water are liable to pass into the passenger compartment along the door or vehicle body.

Meanwhile, the cost of manufacturing a weather strip increases when the drip lip is formed up to a location that corresponds to the side edge of the door.

PRIOR ART LITERATURE

Patent Literature 1: Japanese Laid-open Patent Publication No. 2003-25931

SUMMARY OF INVENTION

Technical Problem

An object of the present invention is to provide a weather strip that can be manufactured at low cost while having a drip lip.

Solution to Problem

In accordance with the present invention, there is provided a weather strip provided to an edge part of an opening of a door of a vehicle body and adapted to come into contact with the door when the door is closed, which comprises: an attachment base section attached to the vehicle body; a seal section extending from the attachment base section toward the door; and a lip-shaped drip lip provided below the seal section in an area that follows the upper edge section of the door, wherein the seal section includes: an upper edge section seal for contacting the upper edge section of the door; a side edge section seal for contacting a side edge section of the door; and a connecting section seal providing connection from the upper edge section seal to the side edge section seal, the seal section further includes a first drip channel capable of collecting water from a vehicle exterior, a second drip channel is formed between the seal section and the drip lip, for collecting water that travels along a vehicle exterior side of the seal section, and a communication section is formed in the connecting section seal for providing communication between the first drip channel and the second drip channel.

Preferably, the seal section takes the shape of a lip extending from the attachment base section toward a direction away from the door opening and the vehicle exterior side, and the first drip channel is formed between the seal section and the attachment base section.

Preferably, the seal comprises: an extension section that extends from the attachment base section toward to the vehicle exterior side; and a contact section that curves from the extension section, extends toward the direction away from the door opening, and contacts the upper edge section and the side edge section of the door, the distal end of the drip lip being connected to the extended section in the connecting section seal.

Preferably, the drip lip and the contact section of the connecting section seal are formed flush with each other.

Preferably, the communication section is formed by the extension section being absent.

Preferably, the distal end of the drip lip extends along a curved section between the extension section and the contact section, nearer to the upper edge section seal than the connecting section seal, and is connected to the curved section at a lengthwise-direction end section.

Advantageous Effects of Invention

In the present invention, a communication section, which communicates between a first drip channel (seal section) and a second drip channel (drip lip), is formed in a connecting section seal that connects the upper edge section seal to the side edge section seal. Water that has passed through the first drip channel and water that has passed through the second drip channel merges in the communication section. Merging allows the water that has passed through the second drip channel to flow toward the side edge section seal. Accordingly, it is possible to prevent droplets from falling in the end section of the upper edge of the door. Also, there is no need to form a drip lip in a location nearer to the side edge section seal than the communication section in order to cause merging. In other words, a drip lip is not required to be formed in the side edge section seal. Accordingly, low-cost components can be used in the side edge seal section. Using a low-cost side edge section seal makes it possible to reduce the cost of the weather strip overall.

Additionally, forming a drip lip makes it possible to prevent droplets that have migrated over the upper edge section seal from falling toward the door opening. The end section of the drip lip can be closed off at the connecting section seal and the water in the second drip channel can be made to flow to the first drip side with the aid of the communication section, whereby water in the second drip channel can be prevented from overflowing from the end section of the drip lip.

Furthermore, in the present invention, the seal section has a lip shape extending from the attachment base section toward a direction away from the door opening and the vehicle exterior side, and the first drip channel is formed between the seal section and the attachment base section. In other words, the base of the lip-shaped seal section is the first drip channel The first drip channel can be formed by a simple structure. Since the structure is simple, the cost of the weather strip can be reduced.

Additionally, since the seal section is formed in a lip shape, the seal can be kept from protruding from between the door and the vehicle body to a greater extent than can a hollow seal.

Furthermore, in the present invention, the distal end of the drip lip is connected to an extension section in the connecting section seal, and the contact section extends from the extension section. Movement (flexibility) of the contact section is thereby unimpeded even when the distal end of the drip lip is connected to the extension section. Accordingly, it is possible to ensure high seal performance in the seal section.

Furthermore, in the present invention, the drip lip and the contact section of the connecting section seal are formed flush with each other. The contact section and the drip lip thereby constitute a single continuous seal lip in the coupling section, and excellent external appearance can therefore be obtained.

Furthermore, in the present invention, the communication section is formed by the extension section being absent. In other words, a communication section can be formed by a simple structure that eliminates an extension section that is made extraneous by the contact section being connected to the drip lip. It is thereby possible to manufacture an even lower cost weather strip.

Furthermore, in the present invention, the distal end of the drip lip extends along a curved section between the extension section and the contact section on the side nearer to the upper edge section seal than the connecting section seal, and is connected to the curved section at a lengthwise-direction end section. The drip lip and the contact section are thereby continuous, and a pleasing external appearance can therefore be obtained. Also, it is possible that the extension section will collapse to the drip lip side by the reactive force of the seal section when the door is closed. In such a case, collapsing can be inhibited because the distal end of the drip lip is connected and rigidity is enhanced. It is thereby possible to ensure strong seal performance in the seal section.

BRIEF DESCRIPTION OF DRAWINGS

FIG. 3 is a perspective view of the upper edge section and the connecting section shown in FIG. 2;

FIG. 4 is a cross section taken along line 4-4 of FIG. 2;

FIG. 5 is a cross section taken along line 5-5 of FIG. 2;

FIGS. 10(a), 10(b) and 10(c) are views showing the effect of the weather strip shown in FIG. 1.

DESCRIPTION OF EMBODIMENTS

Figure 1:
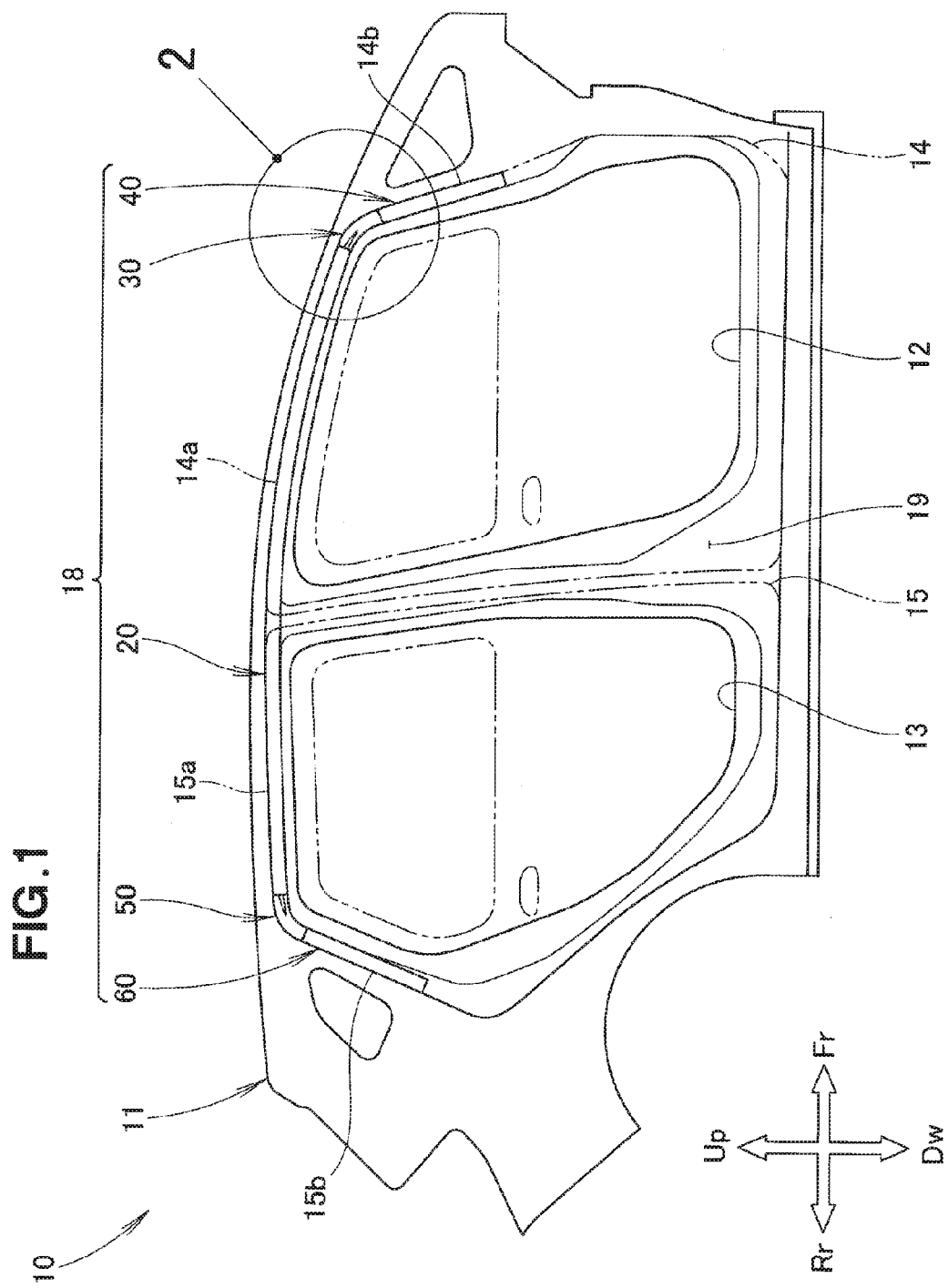
FIG. 1 is a side view of a vehicle body in which the weather strip according to an embodiment of the present invention has been attached.

Embodiments of the present invention are described below with reference to the attached drawings. In the description, the terms left and right are used with reference to an occupant of a vehicle in which the weather strip has been attached, and the terms front and rear are used in reference to the direction of travel of the vehicle. In the drawing, Fr indicates frontward, Rr indicates rearward, Ce indicates the lateral center, Up indicates up, and Dw indicates down.

<Embodiments>

As shown in FIG. 1, front-section and rear-section door openings 12, 13 are formed in the right side section panel 11 (vehicle body 11) constituting a vehicle 10. A front section door 14 (door 14) and rear section door 15 (door 15) is swingably attached to the right side section panel 11 so that the door openings 12, 13 can be covered. A resin weather strip 18 that makes contact with the doors 14, 15 when the doors 14, 15 are closed is attached to the edge section of the door openings 12, 13.

The weather strip 18 is disposed substantially in a U shape that opens downward and serves as a seal for preventing penetration of water into the passenger compartment. A clip can be used or any other method can be used to attach the weather strip 18 to the right side section panel 11.

Figure 2:
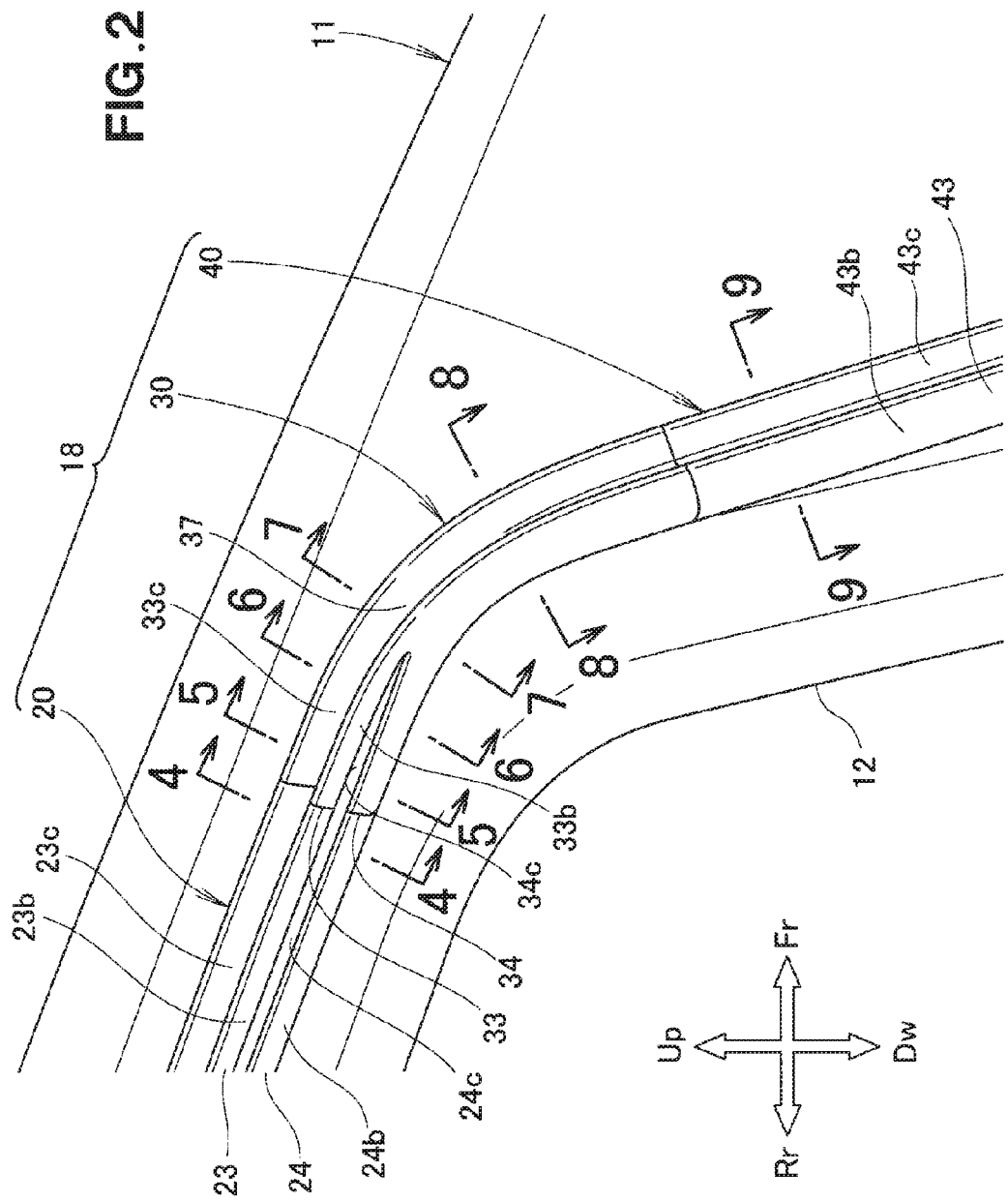
FIG. 2 is an enlargement of section 2 of FIG. 1.

Reference will also be made to FIGS. 2 and 3. In FIG. 3, the weather strip removed from the right side section panel 11 is shown diagonally from above. The weather strip 18 comprises an upper edge section 20 arranged along the upper edge of the rear section door 15 from the upper edge of the front section door 14, a front corner section 30 arranged along the corner of the upper front section of the front section door 14 and provided in continuous fashion from the front end of the upper edge section 20, a front edge section 40 (side edge section 40) arranged along the front edge of the front section door 14 and provided in continuous fashion from the lower front end of the front corner section 30, a rear corner section 50 (connecting section 50) arranged along the corner of the upper rear section of the rear section door 15 and provided in continuous fashion from the rear end of the upper edge section 20, and a rear edge section 60 (side edge section 60) arranged along the rear edge of the rear section door 15 and provided in continuous fashion from the lower rear end of the rear corner section 50.

The upper edge section 20 presents a substantially V-shaped profile that widens downward so that the location corresponding to a center pillar 19 is at the highest point. In other words, droplets collected by the weather strip 18 flow toward the front in front of the center pillar 19. Droplets flow toward the rear behind the center pillar 19.

The basic configuration of the front corner section 30 and the rear corner section 50 is the same. The front corner section 30 will be described in detail below. A detailed description of the rear corner section 50 is omitted. The basic configuration of the front edge section 40 and the rear edge section 60 is the same. The front edge section 40 will be described in detail below. A detailed description of the rear edge section 60 is omitted.

Reference will be made to FIG. 4, it will be seen that part of the weather strip 18 is formed with a modified E-shaped cross-section. The upper edge section 20 presents a substantially uniform cross-sectional shape from the front end to the rear end. The upper edge section 20 comprises an attachment base section 21 (upper edge section attachment base section 21) attached to a right side section panel 11, an upper lip 22 (upper edge section upper lip 22) that is in contact with the right side section panel 11 from the upper end of the attachment base section 21 outward in the lateral direction, a seal section 23 (upper edge section seal 23) which extends from the center in the height direction of the attachment base section 21 outward in the lateral direction and is capable of contact with the door (FIG. 1, reference numerals 14, 15), and a drip lip 24 (upper edge section drip lip 24) extending from the lower end of the attachment base section 21 outward in the lateral direction. As shown in FIGS. 4 and 10(*a*) of the drawings, the distal end 24*b* of the drip lip 24 is positioned nearer to the vehicle body side than is the distal end of the seal section 23, and the distal end of the drip lip is configures to be spaced inwardly away from the door 14, when the door is closed, in at least a portion of the weather strip 18.

A weak section 21*a* is formed in continuous fashion in the longitudinal direction in the attachment base section 21. The weak section 21*a* is formed by a substantially rectangular hole opened in a portion of the attachment base section 21. Forming a weak section 21 a facilitates moderate flexing of the seal section 23 and allows closer contact with the door. A plurality of projections 21*b* protruding toward the right side section panel 11 is formed on the surface of the attachment base section 21 on the right side section panel 11 side. These projections 21*b* are formed in continuous fashion in the longitudinal direction and the distal ends are in contact with the right side section panel 11.

The seal section 23 presents a substantially L-shaped profile and comprises an extension section 23*a* (upper edge section extension section 23*a*) extending substantially horizontal from the attachment base section 21 outward in the lateral direction, and a contact section 23*b* (upper edge section contact section 23*b*) which extends substantially perpendicularly upward from the distal end of the extension section 23*a* and contacts the door. The door opening (FIG. 1, reference numerals 12, 13) is formed below the upper edge section 20 and the seal section 23 can therefore extend in the direction away from the door opening. The upper surface of the extension section 23*a* is a first drip channel 23*c* (upper edge section first drip channel 23*c*) through which water collected from the vehicle exterior flows.

The drip lip 24 presents a substantially V-shaped profile and comprises a first segment section 24*a* extending at a downward slope from the attachment base section 21 outward in the lateral direction, and a second segment section 24*b* extending outward in the lateral direction at an upward slope from the end section of the first segment section 24*a* on the vehicle exterior side. The upper surfaces of the first segment section 24*a* and the second segment section 24*b* are a second drip channel 24*c* (upper edge section second drip channel 24*c*) capable of collecting water that travels along the vehicle exterior side of the seal section 23.

The second drip channel 24*c* is formed to a shallower depth than the first drip channel 23*c*. The amount of water that flows through the second drip channel 24*c* is less than the amount of water that flows through the first drip channel 23*c*. Accordingly, even if the second drip channel 24*c* is made shallower than the first drip channel 23*c*, water does not overflow from the second drip channel 24*c*. On the other hand, the second drip channel 24*c* is shallower than the first drip channel 23*c*, thereby allowing the weather strip 18 to be made smaller.

In particular, as long as the second drip channel 24*c* is V shaped, water can be reliably made to flow to a location at the bottom of the V. This is desirable in that the shape is uncomplicated and the flow of water can be readily controlled.

Reference will be made to FIGS. 5 to 8. The front corner section 30 is a member which continuously changes in cross section. In particular, the cross-sectional shape of the front corner section 30 is similar to the cross-sectional shape of the upper edge section in the location near the upper edge section (FIG. 4, reference numeral 20), as shown in FIG. 5.

The front corner section 30 connects the upper edge section and the front edge section (FIG. 1, reference numeral 40) and in this sense may also be referred to as "connecting section 30." The front corner section 30 may be referred to below, as appropriate, as "connecting section 30."

Reference will be made to FIG. 5. The connecting section 30 comprises the attachment base section 31 (attachment base section 31 of the connecting section) attached to the right side section panel 11, an upper lip 32 (connecting section upper lip 32) which extends from the upper end of the attachment base section 31 outward in the lateral direction and is in contact with the right side section panel 11, a seal section 33 (connecting section seal 33) which extends from the center in the height direction of the attachment base section 31 outward in the lateral direction and is capable of contact with the door (FIG. 1, reference numerals 14, 15), and a drip lip 34 (connecting section drip lip 34) extending from the lower end of the attachment base section 31 outward in the lateral direction.

A plurality of projections 31*b* protruding toward the right side section panel 11 is formed on the surface of the attachment base section 31 on the right side section panel 11 side. These projections 31*b* are formed in continuous fashion in the attachment base section 31 and the distal ends are in contact with the right side section panel 11.

The seal section 33 presents a substantially L-shaped profile and comprises an extension section 33*a* (connecting section extension section 33*a*) extending substantially horizontal from the attachment base section 31 outward in the lateral direction, and a contact section 33*b* (connecting section contact section 33*b*) which extends substantially vertically upward from the distal end of the extension section 33*a*. The door opening (FIG. 1, reference numerals 12, 13) is formed below the connecting section 30 and the seal section 33 can therefore extend in the direction away from the door opening. The upper surface of the extension section 33*a* is a first drip channel 33*c* (connecting section first drip channel 33*c*) through which water collected from the vehicle exterior flows.

The drip lip 34 presents a substantially V-shaped profile and comprises a first segment section 34*a* extending at a downward slope from the attachment base section 31 outward in the lateral direction, and a second segment section 34*b* extending outward in the lateral direction at an upward slope from the end section of the first segment section 34*a* on the vehicle exterior side. The upper surface of the first segment section 34*a* and the second segment section 34*b* are a second drip channel 34*c* (connecting section second drip channel 34*c*) capable of collecting water that travels along the vehicle exterior side of the seal section 33.

The second drip channel 34*c* is formed to a shallower depth than the first drip channel 33*c*. The amount of water that flows through the second drip channel 34*c* is less than the amount of water that flows through the first drip channel 33*c*. Accordingly, even if the second drip channel 34*c* is made to be shallower than the first drip channel 33*c*, water does not overflow from the second drip channel 34*c*. On the other hand, the second drip channel 34*c* is shallower than the first drip channel 33*c*, thereby allowing the weather strip 18 to be made smaller.

In particular, as long as the second drip channel 34*c* is V shaped, water can be reliably made to flow to a location at the bottom of the V. This is desirable in that the shape is uncomplicated and the flow of water can be readily controlled.

Figure 6:
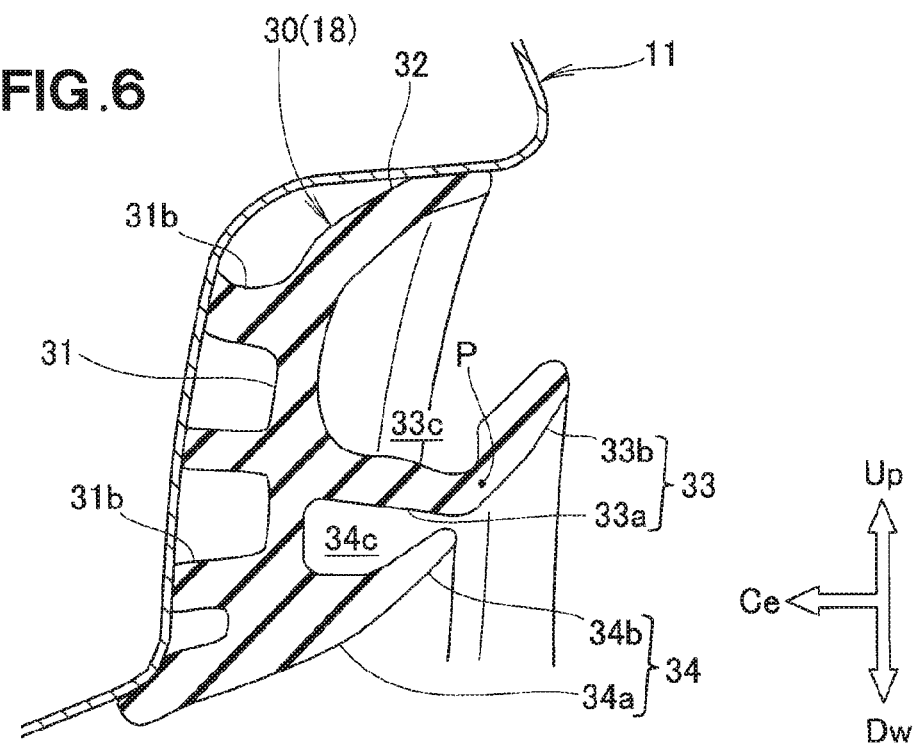
FIG. 6 is a cross section taken along line 6-6 of FIG. 2.

Reference will also be made to FIG. 6. The distal end of the drip lip 34 comes closer in continuous fashion to the seal section 33 in progress from the upper edge section (FIG. 1, reference numeral 20) to the front edge section (FIG. 1, reference numeral 40). The distal end of the drip lip 34 extends toward the curved section P, which is the boundary between the extension section 33a and the contact section 33b.

Figure 7:
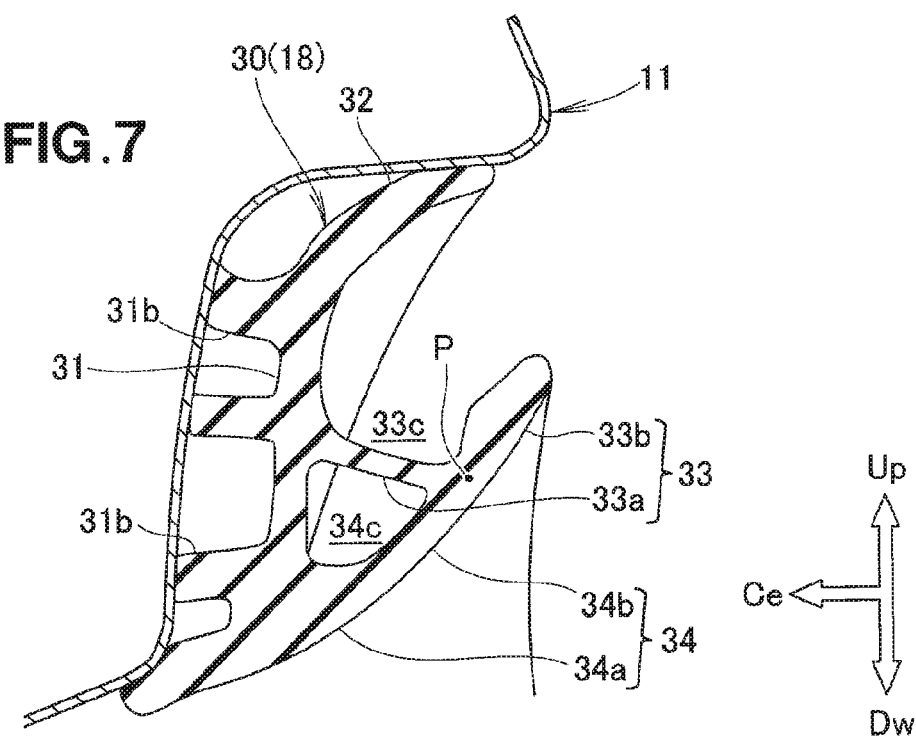
FIG. 7 is a cross section taken along line 7-7 of FIG. 2.

Reference will be made to FIG. 7. Furthermore, the distal end of the drip lip 34 is integral with the seal section 33 in locations near the front edge section. In other words, the distal end of the drip lip 34 is connected to the curved section P. The drip lip 34 and the contact section 33b are formed flush with each other.

Figure 8:
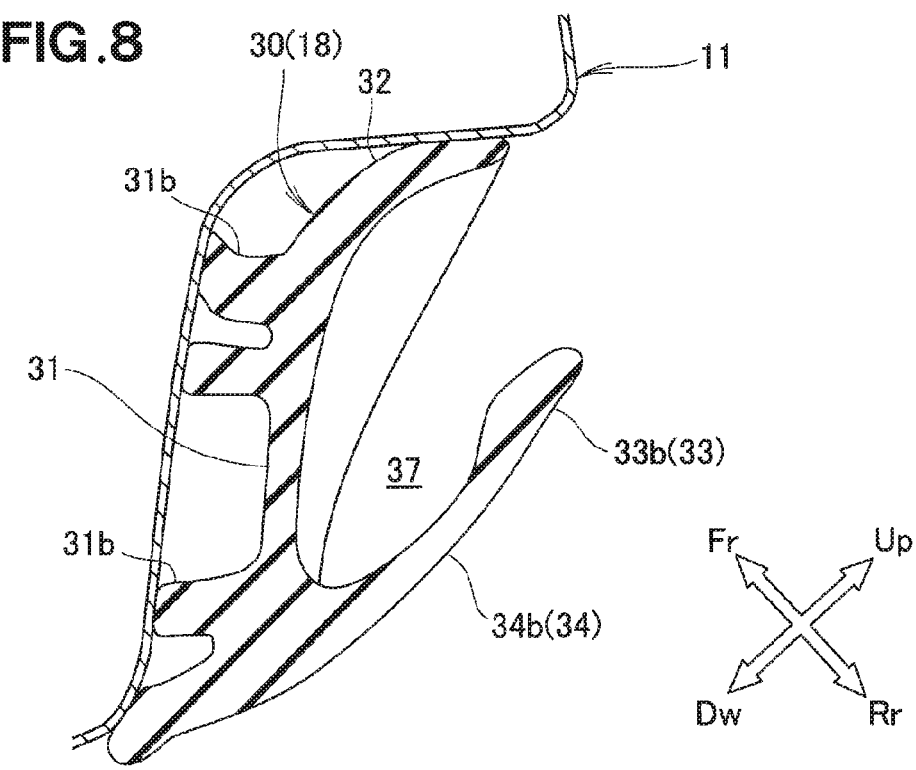
FIG. 8 is a cross section taken along line 8-8 of FIG. 2.

Reference will be made to FIG. 8. The extension section 33a is absent in locations near the front edge section. Reference will also be made to FIG. 7. A communication section 37, which communicates between the first drip channel 33c and the second drip channel 34c, is formed in locations near the front edge section. The communication section 37 formed by the extension section 33a being absent.

Figure 9:
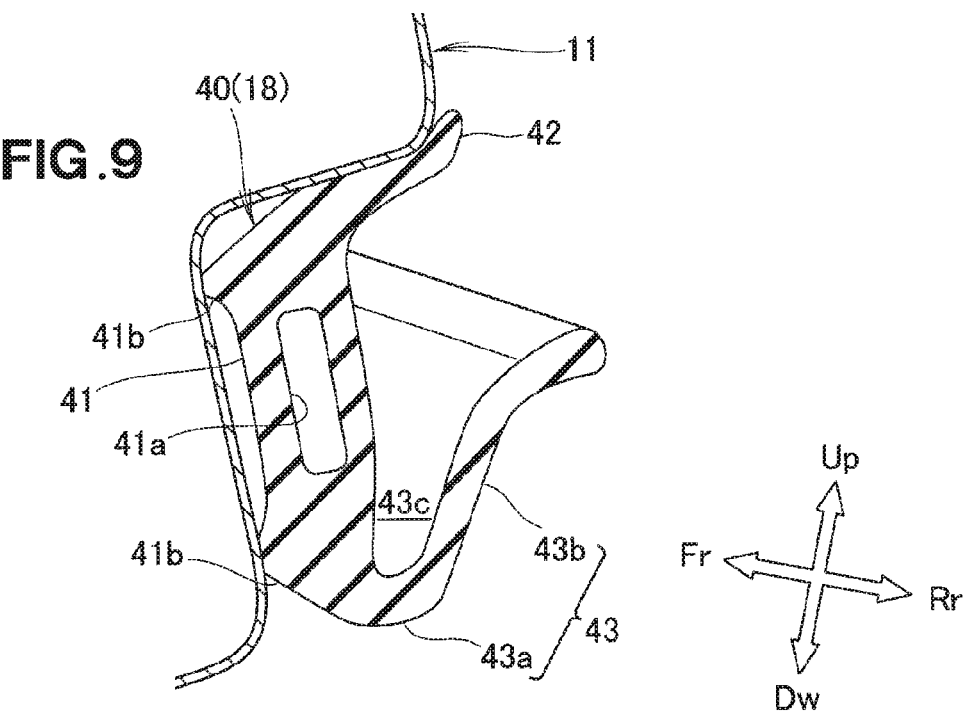
FIG. 9 is a cross section taken along line 9-9 of FIG. 2.

Reference will be made to FIG. 9. The front edge section 40 comprises an attachment base section 41 (front edge section attachment base section 41) attached to the right side section panel 11, an upper lip 42 (front edge section upper lip 42) that is in contact with the right side section panel 11 from the upper end of the attachment base section 41 outward in the lateral direction, and a seal section 43 (front edge section seal 43) which extends upward from the lower end of the attachment base section 41 and is capable of contact with the door (FIG. 1, reference numerals 14, 15).

A weak section 41a is formed in the attachment base section 41 in continuous fashion along the right side section panel 11. The weak section 41a is formed by a substantially rectangular hole opened in a portion of the attachment base section 41. Forming a weak section 41a facilitates moderate flexing of the seal section 43 and allows closer contact with the door. A plurality of projections 41b protruding toward the right side section panel 11 is formed on the surface of the attachment base section 41 on the right side section panel 11 side. These projections 41b are formed in continuous fashion along the right side section panel 11 and the distal ends are in contact with the right side section panel 11.

The seal section 43 comprises an extension section 43a (front edge section extension section 43a) extending rearward from the attachment base section 41, and a contact section 43b (front edge section contact section 43b) which extends upward from the distal end of the extension section 43a and contacts the door. The upper surface of the extension section 43a is a first drip channel 43c (front edge section first drip channel 43c) through which water collected from the vehicle exterior flows.

Reference will be made to FIG. 10(a). The contact section 23b contacts the upper edge section 14a of the front section door 14 with the front section door 14 closed. The droplets W come together at the distal end of the contact section 23b. In such a state, the front section door 14 may be opened.

Reference will be made to FIG. 10(b). A portion of the droplets W fall to the first drip channel 23c. The remainder of the droplets W travel over the external peripheral surface of the contact section 23b and fall to the second drip channel 24c.

Reference will be made to FIG. 10(c). Fallen droplets flow toward the front of the vehicle body through the first drip channel 23c or the second drip channel 24c. The droplets that flow toward the front of the vehicle body arrive at the connecting section 30 and pass through the first drip channel 33c and the second drip channel 34c. The first drip channel 33c is absent in a location on the front edge section (FIG. 1, reference numeral 40) side of the connecting section 30. The first drip channel 33c and the second drip channel 34c are thereby in communication with each other (see communication section 37), and the droplets that have passed through the drip channels 33c, 34c merge with each other. The merged droplets flow toward the first drip channel (FIG. 9, reference numeral 43c) of the front edge section.

Reference will also be made to FIG. 1. The weather strip 18 according to the present invention is attached to the upper section of the vehicle body, is formed with seal sections 23, 33, 43 for collecting water from the vehicle exterior, and below the locations corresponding to the seal sections 23, 33, 43 on the upper edge section of the door 14, and is based on having drip lips 24, 34 for collecting water that travels along the surface of the vehicle exterior side of the seal sections 23, 33. A channel 33c formed by the seal section 33 and a channel 34c formed by the drip lip 34 merge at the end part of the drip lips 24, 34.

In summary of the above, the following should be noted with reference to FIGS. 1, 3 to 5, 8, and 9.

The weather strip 18, which is provided to the edge section of the door openings 12, 13 of the vehicle body 11 and makes contact by closing of the doors 14, 15, presents a substantially U-shaped profile and comprises an upper edge section 20 extending toward the longitudinal direction in the upper section of the vehicle body 11, side edge sections 40, 60 that extend toward the vertical in the front and rear of the vehicle body 11, and connecting sections 30, 50 that connect the upper edge section 20 and the side edge sections 40, 60.

The weather strip 18 comprises attachment base sections 21, 31, 41 attached to the vehicle body 11, seal sections 23, 33, 43 extending from the attachment base sections 21, 31, 41 toward the door, and lip-shaped drip lips 24, 34 provided below the seal sections 23, 33 in an area along the upper edge sections 14a, 15a of the doors 14, 15.

The seal sections 23, 33, 43 comprise an upper edge seal 23 that makes contact with the upper edge sections 14a, 15a of the doors 14, 15, a side edge sections seal 43 that makes contact with the side edge section 14b (15b) of the doors 14, 15, and a connecting section seal 33 for connecting from the upper edge section seal 23 to the side edge section seal 43.

The seal sections 23, 33, 43 comprise first drip channels 23c, 33c, 43c that are capable collecting water from the vehicle exterior, and have second drip channels 24c, 34c, which are capable of collecting water that has traveled along the vehicle exterior side of the seal sections 23, 33, formed between the seal sections 23, 33 and the drip lips 24, 34. A communication section 37 for communicating with the first drip channel 33c and the second drip channel 34c is formed in the connecting section 30.

Water that has passed through the first drip channels 23c, 33c and water that has passed through the second drip channels 24c, 34c merge at the communication section 37. Merging allows the water that has passed through the second drip channels 24c, 34c to flow toward the side edge section 40. Accordingly, it is possible to prevent droplets from falling at the end section of the upper edge of the doors 14, 15. Also, a drip lip 34 is not required to be formed in a location nearer the side edge section 40 than the communication section 37 in order to achieve merging. In other words, a drip lip 34 is not required to be formed in the side edge section 40. Accordingly, low-cost components can be used in the side edge section 40. Using a low-cost side edge section 40 makes it possible to reduce the cost of the weather strip 18 overall.

Additionally, forming drip lips 24, 34 makes it possible to prevent droplets that have migrated over the upper edge section seal 23 from falling toward the door openings 12, 13. Furthermore, the end section of the drip lip 34 can be closed off at the connecting section 30, and the water in the second drip channel 34c can be made to merge with the water in the first drip channel 33c with the aid of the communication section 37, whereby water in the second drip channel 34c can be prevented from overflowing from the end section of the drip lip 34.

The seal sections 23, 33, 43 have a lip shape extending from the attachment base sections 21, 31, 41 toward a direction away from the door openings 12, 13 and the vehicle exterior side, and the first drip channels 23c, 33c, 43c are formed between the seal sections 23, 33, 43 and the attachment base sections 21, 31, 41.

In other words, the bases of the lip-shaped seal sections 23, 33, 43 form the first drip channels 23c, 33c, 43c. The first drip channels 23c, 33c, 43c can be formed by a simple structure. Since the structure is simple, the cost of the weather strip 18 can be reduced.

Additionally, since the seal sections 23, 33, 43 are formed in a lip shape, the seals can be kept from protruding from between the doors 12, 13 and the vehicle body 11 to a greater extent than a hollow seal.

The seal sections 23, 33, 43 comprise extension sections 23a, 33a, 43a extended from the attachment base sections 21, 31, 41 toward the vehicle exterior side, and contact sections 23b, 33b, 43b that curve from the extension sections 23a, 33a, 43a, extend toward a direction away from the door openings 12, 13, and make contact with the upper edge sections 14a, 15a and side edge sections 14b, 15b of the doors 14, 15. The distal ends of the drip lips 24, 34 are connected to the extension section 33a in the connecting section 30.

The distal end of the drip lip 34 is connected to the extension section 33a in the connecting section 30, and the contact section 33b extends from the extension section 33b. Movement (flexibility) of the contact section 33b is thereby unimpeded even when the distal end of the drip lip 34 is connected to the extension section 33a. Accordingly, it is possible to ensure strong seal performance in the seal section 33.

The drip lip 34 and the contact section 33b of the connecting section 30 are formed flush with each other. The contact section 33b and the drip lip 34 thereby constitute a single continuous seal lip, and excellent external appearance can therefore be obtained.

The communication section 37 is formed by the extension section 33a being absent. In other words, a communication section 37 can be formed by a simple structure that eliminates an extension section 33a that is made extraneous by the contact section 33b being connected to the drip lip 34. It is thereby possible to manufacture an even lower cost weather strip 18.

The distal end of the drip lip 34 extends along a curved section P, which is the boundary between the extension section 33a and the contact section 33b in a location nearer to the upper edge section 20 than communication section 37, and is connected to the curved section P at a lengthwise-direction end section.

The drip lip 34 and the contact section 33b are thereby continuous, and excellent external appearance can therefore be obtained. Also, it is possible that the extension section 33a will collapse to the drip lip 34 side by the reactive force of the seal section 33 when the doors 14, 15 are closed. In such a case, collapsing can be inhibited because the distal end of the drip lip 34 is connected and rigidity is enhanced. It is thereby possible to ensure strong seal performance in the seal section 33.

The weather strip according to the present invention was described using the example of a door attached to a side section of a vehicle body, but tailgate applications are also possible. In such a case, the exterior of the vehicle body described in the embodiments can instead be read, as appropriate, as the rear of the vehicle body. Similarly, the front and rear in the embodiments can instead be read for the vehicle width interior and exterior, and for the left and right of the vehicle body.

INDUSTRIAL APPLICABILITY

The weather strip of the present invention is advantageous for a passenger car.

REFERENCE SIGNS LIST

11: right side section panel (vehicle body)
12: front-section door opening (door opening)
13: rear-section door opening (door opening)
14: front section door (door)
14a: upper edge section
15: rear section door (door)
15a: upper edge section
18: weather strip
21: attachment base section (attachment base section of upper edge section)
23: seal section (upper edge section seal)
23a: extension section (extension section of the upper edge section)
23b: contact section (contact section of the upper edge section)
23c: first drip channel (first drip channel of the upper edge section)
24: drip lip (drip lip of the upper edge section)
24c: second drip channel (second drip channel of the upper edge section)
31: attachment base section (attachment base section of the connecting section)
33: seal section (connecting section seal)
33a: extension section (extension section of the connecting section)
33b: contact section (contact section of the connecting section)
33c: first drip channel (first drip channel of the connecting section)
34: drip lip (drip lip of the connecting section)
34c: second drip channel (second drip channel of the connecting section)
37: communication section
41: attachment base section (attachment base section of the front edge section)
43: seal section (front edge section seal)
43a: extension section (extension section of the front edge section)
43b: contact section (contact section of the upper edge section)
43c: first drip channel (first drip channel of the front edge section)
P: curved section

The invention claimed is:

1. A weather strip provided to an edge part of an opening of a door of a vehicle body and adapted to come into contact with the door when the door is closed, said weather strip comprising:
an attachment base section attached to the vehicle body;
a seal section extending from the attachment base section toward the door; and
a lip-shaped drip lip provided below the seal section in an area that follows the upper edge section of the door, the drip lip having a distal end configured to be spaced inwardly away from the door, when the door is closed, in at least a portion of the weather strip,
wherein:
part of the weather strip is formed with a modified E-shaped cross-section, and the seal section includes:
an upper edge section seal configured to contact the upper edge section of the door when the door is closed;
a side edge section seal configured to contact a side edge section of the door when the door is closed; and
a connecting section seal providing connection from the upper edge section seal to the side edge section seal,
the seal section further includes a first drip channel configured to collect water from a vehicle exterior,
a second drip channel is formed between the upper edge section seal of the seal section and the drip lip, such that the second drip channel collects water that travels along a vehicle exterior side of the upper edge section seal, the second drip channel being separated from the first drip channel by the upper edge section seal, and
a communication section is formed in the connecting section seal, the communication section configured to permit fluid communication between the first drip channel and the second drip channel to the first drip channel.

2. The weather strip of claim 1, wherein:
the seal section takes a form of a lip extending from the attachment base section in a direction away from the door opening and the vehicle exterior side; and
the first drip channel is provided between the seal section and the attachment base section.

3. The weather strip of claim 2, wherein:
the seal comprises: an extension section extending from the attachment base section toward the vehicle exterior side; and a contact section being curved from the extension section, extending toward the direction away from the door opening and adapted to contact the upper edge section and the side edge section of the door; and
the distal end of the drip lip is connected to the extension section in the connecting section seal.

4. The weather strip of claim 3, wherein the drip lip and the contact section of the connecting section seal are formed flush with each other.

5. The weather strip of claim 4, wherein the communication section is formed by the extension section being absent in a portion of the weather strip.

6. The weather strip of claim 5, wherein the distal end of the drip lip extends along a curved section between the extension section and the contact section, nearer to the upper edge section seal than the connecting section seal, and is connected to the curbed section at a lengthwise-direction end section.

7. The weather strip of claim 4, wherein the distal end of the drip lip extends along a curved section between the extension section and the contact section, nearer to the upper edge section seal than the connecting section seal, and is connected to the curbed section at a lengthwise-direction end section.

8. The weather strip of claim 3, wherein the distal end of the drip lip extends along a curved section between the extension section and the contact section, nearer to the upper edge section seal than the contacting section seal, and is connected to the curbed section at a lengthwise-direction end section.

9. The weather strip of claim 1, wherein a bottom face of the first drip channel in the upper edge section seal and a bottom face of the second drip channel in the upper edge section seal are, respectively, extended toward and continuously connected to a bottom face of the first drip channel in the connecting section seal.

10. The weather strip of claim 1, wherein
the first drip channel is configured to collect water from a vehicle exterior, both in a case where the door is open and in a case where the door is closed, and
the second drip channel is configured to collect water that travels along a vehicle exterior side of the upper edge section seal, in a case where the door is open.

* * * * *